United States Patent [19]

Proto

[11] 4,108,359
[45] Aug. 22, 1978

[54] APPARATUS FOR VERIFYING THE EXECUTION OF A SEQUENCE OF CODED INSTRUCTIONS

[75] Inventor: Richard C. Proto, Laurel, Md.

[73] Assignee: The United States of America as represented by the Secretary of the Army, Washington, D.C.

[21] Appl. No.: 782,692

[22] Filed: Mar. 30, 1977

[51] Int. Cl.² ............................................. G06F 11/08
[52] U.S. Cl. .................................. 235/304; 235/306; 235/312
[58] Field of Search .... 235/153 A, 153 AC, 153 AK, 235/153 R, 153 AM, 151.31, 304, 306, 312; 324/73 R

[56] References Cited

U.S. PATENT DOCUMENTS

| 3,582,633 | 6/1971 | Webb | 235/153 AC |
|---|---|---|---|
| 3,626,206 | 12/1971 | Stebbins | 235/153 A |
| 3,651,315 | 3/1972 | Collins | 235/153 AC |
| 3,838,264 | 9/1974 | Maker | 235/153 AM |

Primary Examiner—Charles E. Atkinson
Attorney, Agent, or Firm—John R. Utermohle; Barry N. Young

[57] ABSTRACT

Apparatus for detecting errors in the execution of a sequence of coded instructions. The apparatus includes a feed-back shift register to generate a digital sequence which is combined with the sequence of instructions to be verified to compute a unique sequence checkword. This computed sequence checkword is compared with a stored, predetermined reference sequence checkword. If any errors have occurred in the execution of the sequence of instructions, the computed and the stored sequence checkwords will disagree, resulting in an output which may be used to halt the process or otherwise cause an alarm. It is an advantage of the apparatus, that it may be easily implemented with a minimum number of logic elements to produce a sequence monitoring device that has an extremely high probability of detecting errors.

9 Claims, 2 Drawing Figures

APPARATUS FOR VERIFYING THE EXECUTION OF A SEQUENCE OF CODED INSTRUCTIONS

BACKGROUND OF THE INVENTION

This invention relates generally to the field of detecting errors in code sequences and more particularly to the field of detecting errors in the execution of a sequence of coded instructions in applications utilizing processing systems.

In many processing applications, there is a portion of code which is so vital to the operation of the system, that one would like to assure with a high degree of accuracy, that this code is properly executed. Examples of such code might include diagnostic programs which test the good health of the processing system or external devices, code controlling particularly critical steps in some process, or code which verifies the operation of alarm circuitry which monitors the operation of the system. This code is typically stored in memory devices as a sequence of instructions which control the operation of the processor. These code sequences, or programs, are made up of a series of multi-bit binary words, which are sequentially provided to the processor in response to the processor commands. Each word of code stored in memory has associated with it a memory address. The processor determines which codewords are sent to it by supplying to the memory a series of addresses. As an address is supplied, the processor reads the word associated with that address. These words instruct the processor to perform certain operations and direct the processor to the next address in the sequence. If an error occurs either in reading the word from memory or in the processor's execution of the instruction, the next address provided to memory will be incorrect, resulting in an erroneous instruction being provided to the processor. The consequences of these erroneous instructions are often very subtle and not readily apparent at the time they occur. For example, if the processor is checking the operation of some external malfunctioning device, the incorrect instruction may result in this malfunction going unnoticed.

One method of overcoming these problems could be to provide additional memory with a duplicate set of the critical code, along with extra code which would verify the critical sequence provided to the processor. However, this method will not detect processor malfunctions, but only malfunctions in the memories. Another method may be to provide a duplicate parallel processor and memory for this portion of critical code, with means to check one processor against the other. In larger processing systems, these techniques may be tolerable. However, in many smaller processing systems, particularly those utilizing integrated circuit chips for microprocessors and memories, such techniques may be overly burdensome and costly. For these systems particularly, it is desirable to have an apparatus which will verify the execution of critical code, without adding unnecessarily to the cost of the processing system. It is to this end that the present invention is directed.

SUMMARY OF THE INVENTION

The present invention is based upon the fact that a sequence of binary words, corresponding to a given sequence of instructions executed by a processor, may be combined with the contents of a regularly stepping n-stage linear feedback shift register, to produce an n-bit checkword. This checkword is dependent upon the set of instructions, the sequence in which the instructions are executed and the length of that sequence. This checkword may be compared to a reference checkword in order to determine whether the correct sequence of instructions are executed by the processor. If errors occur in the execution of the sequence of instructions, the probability that the correct checkword will still be produced is approximately $\frac{1}{2}^n$. Therefore, if the correct checkword is obtained, it may be assumed with a high degree of confidence, the correct sequence was executed.

Accordingly, it is an object of this invention to provide an apparatus which will monitor the execution by a processor of a sequence of coded instructions, to insure that the code is executed properly.

It is also an object of this invention to provide an apparatus which will detect malfunctions in either a processor or some external device controlled by a processor, to verify correct operation.

It is a further object of this invention to provide an apparatus which is capable of detecting errors with a high degree of probability.

It is a still further object of this invention to provide an apparatus which can be easily implemented with a minimum of logic elements.

These and other objects may be advantageously obtained by an apparatus which includes a sequence check register including means for generating a binary sequence and means for combining an input sequence of binary words with the binary sequence to compute a sequence checkword; means for storing a predetermined reference sequence checkword; and means connected to the sequence check register and the storage means for comparing bit-by-bit the computed sequence checkword with the stored reference checkword and for producing an error signal when the compared checkwords differ.

BRIEF DESCRIPTION OF THE DRAWINGS

The following detailed description of the invention may be more fully appreciated when read in conjunction with the accompanying drawings in which.

DETAILED DESCRIPTION OF THE INVENTION

Figure 1:
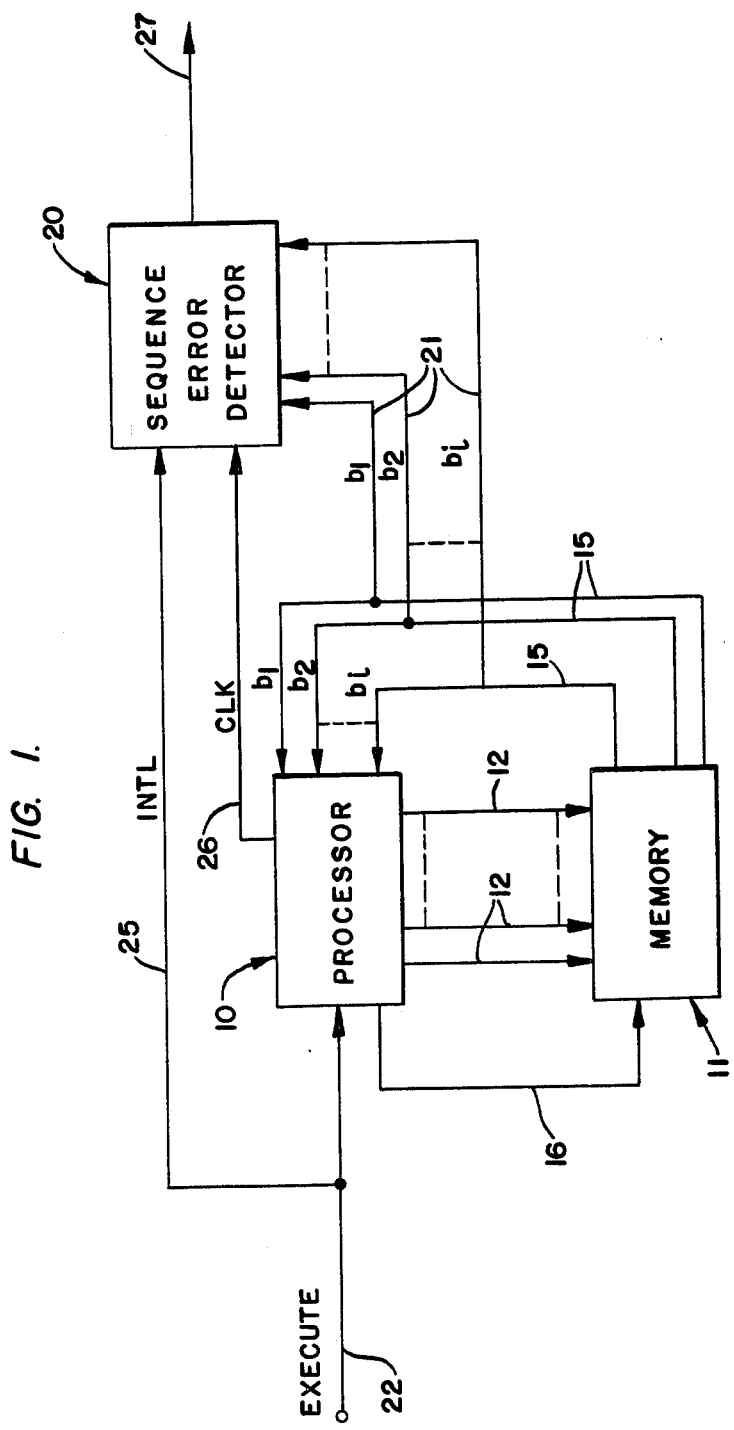
FIG. 1 is an illustration of a typical processing system in which the invention may be used.

FIG. 1 illustrates a typical processing system in which the invention may be used. It includes processor 10, which may be processing data, controlling electronic circuits, or controlling some external devices, not shown, such as may be employed in some manufacturing process. Control programs are stored in memory 11 as a sequence of coded instructions in the form of multi-bit binary words. These control programs specify the data processing or the control function which the processor performs. Memory 11 also may be used for storage of data or the results of processing operations.

Processor 10 accesses either the data or programs stored in memory 11 by providing to memory 11 an address which corresponds to a particular memory location. These addresses, in the form of multi-bit binary words, are provided by processor 10 to memory 11, over parallel lines 12—12. Instructions stored in memory 11 in the form of other multi-bit binary words are then read by processor 10 over parallel lines 15—15, in response to commands provided by processor 10 to memory 11 over line 16.

These multi-bit words may comprise any number of bits depending upon the design of processor 10. However, 8-bit, 12-bit, and 16-bit words are commonly used. Words are read by reading all of the bits in parallel, with each of lines 15—15 corresponding to a particular bit of the instruction word. After the processor completes the operation specified by the word, a new address is provided to memory 11 for the next word of the sequence. The process is then repeated until the entire sequence of instructions has been executed. Some systems may be designed such that either all or a part of the sequence of instructions are stored in sequential memory locations, so that the processor need supply only two addresses and then sequentially read all instructions stored between these two addresses.

The processor and memory illustrated in FIG. 1 may be of any type. However, because of economies of size and cost, the invention is particularly adaptable for use in systems where the processor 10 and memory 11 are integrated circuit chips. For example, processor 10 may be any one of a number of commercially available, integrated circuit microprocessors. Similarly, memory 11 may be a commercially available, integrated circuit read-only-memory (ROM).

Sequence error detector 20, embodying the invention, monitors the execution of the critical sequence of coded instructions by monitoring the instructions provided to processor 10 from memory 11 over parallel lines 15—15. This is accomplished over parallel lines 21—21 connected in parallel with lines 15—15, corresponding to each bit of the instruction word which is provided to the processor from memory 11.

In operation, processor 10 is notified, in some manner, to begin the execution of the critical sequence of instructions. This notification may result from an executive program running in processor 10, which determines which programs stored in memory 11 the processor will execute. At the appropriate times, the executive program notifies the processor to begin the execution of the critical code. This notification may also be provided, for example, by an external command over line 22 as illustrated in FIG. 1. This external command provided over line 22 may, for example, be an operator input. Upon receipt of the command, the processor begins the execution of the critical code by reading the sequence of instructions from memory as previously described.

By whatever means it is provided, the execution command on line 22 also serves to initialize sequence error detector 20 over line 25, so that it can begin monitoring the execution of the sequence by processor 10. As each word of the sequence of instructions is provided to processor 10 in response to processor commands over line 16 to memory 11, a clock signal is provided to sequence error detector 20 over line 26 causing sequence error detector 20 to monitor the word provided to the processor from memory.

After the entire sequence of instructions of the vital code has been executed by the processor, sequence error detector 20 provides an output indication on line 27 that indicates whether or not the sequence of instructions has been executed properly.

Figure 2:
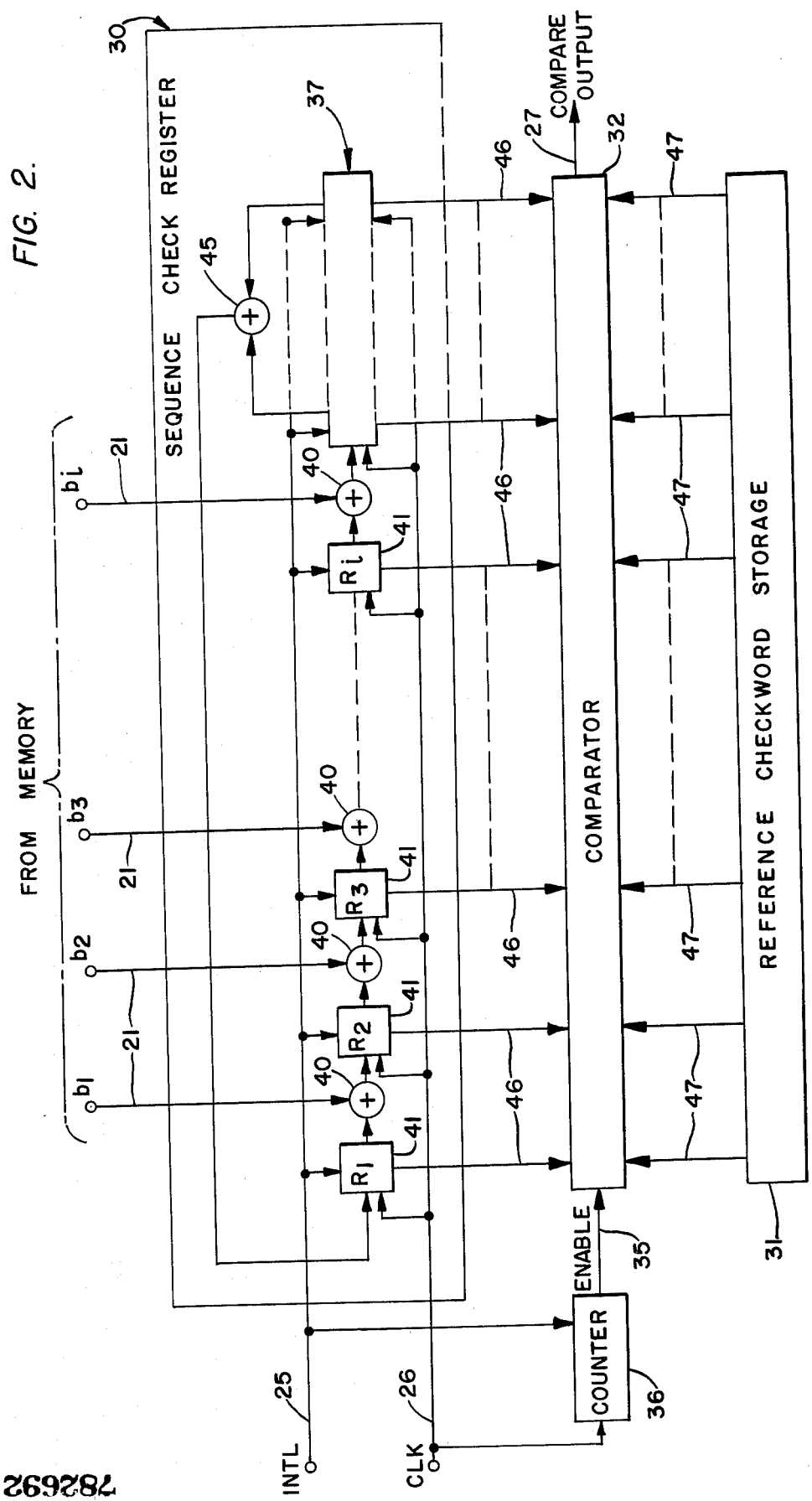
FIG. 2 is a block diagram of a preferred embodiment of the invention.

FIG. 2 illustrates a preferred construction for sequence error detector 20 embodying the invention. There is provided a sequence check register 30 which monitors the sequence of multi-bit binary words provided to processor 10 from memory 11 and computes a sequence checkword, in accordance with the principles to be herein later described. Also provided are storage means 31 for storing a reference sequence checkword and comparator means 32 for comparing the computed sequence checkword, computed by sequence check register 30, with the stored reference checkword. Comparator 32 is also provided with an output 27 to indicate the results of the comparison. Comparator output 27 may be provided, for example, to an external alarm which would notify operating personnel of the incorrect execution of the sequence or it may be provided back to processor 10 to halt its operation. Comparator 32 is enabled over line 35 in response to counter 36 to initiate the comparison between the computed sequence checkword and the stored reference checkword.

Sequence check register 30 comprises an n-stage feedback shift register 37 which generates a predetermined, pseudo-random binary sequence, in accordance with the feedback connections provided. The number, $n$, of stages, 41—41 in the shift register 37 is selected to be greater than the number of bits, $i$, in each binary word. For example, if 12-bit binary words are used, shift register 37 may be selected to have 20 stages 41—41. The outputs from the first $i$ stages, $R_1, R_2, \ldots R_i$, of shift register 37 are connected to one input of one of MOD 2 adders 40—40. The other input to each of MOD 2 adders 40—40 is connected to one of lines 21—21, corresponding to a particular bit, $b_i$, of the multi-bit instruction word provided to processor 10. The output of each of MOD 2 adders 40—40 is then connected to the input of the next shift register stage 41—41. MOD 2 adders 40—40 perform the exclusive-OR logic function, i.e., if the binary inputs to the MOD 2 adder are the same, for example binary "1", the MOD 2 adder output is a binary "0". Likewise, if the two inputs are different, the MOD 2 adder output is a binary "1". The remaining $n - i$ stages of the shift register 37 are connected in normal fashion with the output of each stage 41—41 feeding the input to the next stage 41—41. Feedback is provided to combine the output of two or more shift register stages 41—41 in MOD 2 adder 45. The output of MOD 2 adder 45 is fed back to the input of stage 1. While it is not critical to the invention which shift register stages are selected for feedback, it is desirable that at least one of the stages chosen be close to the end of the shift register, as this will result in the highest probability of detecting errors, as will be explained more fully below.

Shift register 37 generates a predetermined binary sequence in accordance with the feedback connections selected. The inclusion of MOD 2 adders 40—40 on the outputs of the first $i$ stages of the shift register, permits this predetermined binary sequence to be modified by combining it with the binary words comprising the sequence of instructions provided to processor 10. In operation, the execution command 22 to processor 10, to begin execution of the code sequence, is also provided via line 25 to sequence error detector 20. This command is also used to initialize shift register 37 by resetting all stages 41—41 to zero. At the same time, the execution command also resets counter 36. As each multi-bit instruction word is provided to the processor 10 in response to processor commands over line 16 to memory 11, a clock signal is provided on line 26 to shift register 37 and counter 36. This clock signal causes shift register 37 to step once and counter 36 to increment its count by one. Simultaneously, the pattern of ones and zeros corresponding to the multibit instruction word is provided to MOD 2 adders 40—40 via lines 21—21. This causes the 1 - 0 pattern of each of the first $i$ stages of shift register 37, to be modified by MOD 2 adders 40—40 before being shifted to the next succeeding stage, in accordance with the bit pattern of the sequence word on lines 21—21.

As each new instruction word of the sequence is provided to the processor, this process is repeated, with shift register 37 stepping once and counter 36 incrementing its count by 1. When counter 36 reaches a predetermined count, N, equal to the number of words in the critical sequence, an enable signal is provided to comparator 32 over line 35. The 1 - 0 pattern which exists in the $n$ stages 41—41 of shift register 37, represents the unique computed sequence checkword, $n$ bits in length. This computed sequence checkword stored in shift register 37 is provided to comparator 32 over lines 46—46. A precalculated, reference checkword stored in storage device 31 is also provided to comparator 32 over lines 47—47. Comparator 32 then performs a bit-by-bit comparison of the computed sequence checkword and the precalculated reference checkword, and provides either a zero or a one output on line 27, which indicates whether or not the computed and the reference sequence checkwords agree.

For a given feedback connection, the computed sequence checkword stored in shift register 37 after N steps, is determined by not only the bit patterns of the multi-bit words appearing on lines 21—21 at each step, but also by the time sequence in which the words appear. If, for example, shift register 37 is a 20 stage shift register, the probability of a correct computed sequence checkword resulting from an improper sequence, agreeing with the stored reference checkword, is $2^{-20}$, or approximately one chance in a million. Since the length of the sequence generated by shift register 37 is a function of the position of the last tap in the feedback connection, it is desirable that one input to MOD 2 adder 45 be made from one of the last stages of register 37.

Since the correct sequence of instructions to be executed by the processor is known a priori the reference checkword to be stored in storage device 31 is easily determined by inputing the correct sequence into the sequence check register, stepping through the required number of steps, N, equal to the number of words in the sequence, and reading the contents stored in the shift register stages. Similarly, since the number of words, N, in the sequence is known, the counter is easily programmed to provide the enable signal to the comparator when a count of N is reached.

Comparator 32, reference checkword storage device 31, and counter 36, may be implemented in any one of a number of ways known to those skilled in the art. For example, comparator 32 may be conveniently implemented using MOD 2 adders to compare each bit of the computed sequence checkword stored in shift register stages 41—41 with the corresponding bit of the reference sequence checkword stored in storage device 31. A separate MOD 2 adder would be used to compare each bit of the computed checkword to the corresponding bit of the reference checkword. Each MOD 2 adder would have one input connected to one of lines 46—46 and its other input connected to a corresponding one of lines 47—47. If the two bits agree, the output from the MOD 2 adder would be a 0. Otherwise it would be a 1. The outputs of all of the MOD 2 adders, representing the bit-by-bit comparison of the computed sequence checkword and the reference sequence checkword, could then be combined with OR and AND gates such that if any bits differ, a "1" would be obtained. The combined outputs from the MOD 2 adders could then be gated by the enable signal on line 35 from counter 36, such that an output is produced on line 27 at the appropriate time.

Storage device 31 for storing the reference checkword could be either a register having a number of stages equal to the number of bits in the reference checkword or diode logic connected in a manner so as to provide the required 1 - 0 pattern corresponding to the reference checkword. Counter 36 may be a ordinary binary counter, having a maximum count equal to or greater than the number of instructions, N, in the sequence, with the appropriate decoding logic to detect the count, N, corresponding to the number of instructions and logic to provide an enable signal on line 35.

It is also possible to provide a sequence error detector which could check the execution of a variety of different sequences. If, for example, counter 36 and storage device 31 are made programmable devices, one may calculate reference checkwords for each sequence that it is desired to verify, and simply enter the appropriate reference checkword in storage device 31 and count in counter 36 corresponding to the number of steps in the sequence, as each sequence is being executed. Furthermore, this could be done under control of the processor to provide a device capable of dynamically verifying the performance of the system.

While the above description has been with reference to a preferred embodiment, it will be appreciated by those skilled in the art that variations are possible without departing from the scope and spirit of the invention. It is intended that the invention be limited only by the appended claims.

What is claimed is:

1. An apparatus for verifying the execution of an input sequence of coded instruction in the form of $i$-bit binary words, where $i$ is the number of bits in each binary word, comprising:
   a sequence check register including an $n$-stage feedback shift register for generating a binary sequence, where the number of stages, $n$, of said feedback shift register is greater than $i + 1$, and means for combining the input sequence of binary words with said binary sequence to compute an $n$-bit sequence checkword;
   means for storing a predetermined $n$-bit reference sequence checkword; and
   means connected to said sequence check register and said storage means for comparing bit-by-bit said computed sequence checkword with said stored reference checkword and for producing an error signal when the compared checkwords differ.

2. The apparatus of claim 1, further including means for stepping said shift register at least once for each word of said sequence input to said sequence check register.

3. The apparatus of claim 2 wherein said combining means includes means for modifying the contents of $i$ stages of said shift register in accordance with the bits of each word of said input sequence, prior to shifting said contents to the next succeeding shift register stage.

4. The apparatus of claim 3 wherein said modifying means comprises MOD 2 adders connected between the output of each of the first $i$ stages of said shift register and the input to the next succeeding stage.

5. The apparatus of claim 1 wherein said computed checkword is represented by the contents of each of the $n$ stages of said shift register after said shift register is shifted at least N steps, where N is equal to the number of words in said input sequence.

6. The apparatus of claim 5 wherein said comparing means includes a counter which increases its count by one for each word of said sequence input to said sequence check register and which enables said comparison when said counter reaches a count equal to N.

7. The apparatus of claim 6 which further includes means for resetting said shift register and said counter prior to inputting said input sequence.

8. The apparatus of claim 7 wherein said storage means and said counter means are programmable, thereby permitting said apparatus to monitor the execution of different sequences in accordance with said programming.

9. The apparatus of claim 1 wherein said combining means further comprises means for computing a sequence checkword such that the probability of said computed checkword matching said reference checkword, when said sequence of instructions contains an error, is $\frac{1}{2}^n$, where $n$ is the number of bits in each checkword.

* * * * *